US012322368B2

(12) United States Patent
Lovitt et al.

(10) Patent No.: US 12,322,368 B2
(45) Date of Patent: Jun. 3, 2025

(54) ADAPTIVE ANC BASED ON ENVIRONMENTAL TRIGGERS

(71) Applicant: Meta Platforms Technologies, LLC, Menlo Park, CA (US)

(72) Inventors: Andrew Lovitt, Redmond, WA (US); Antonio John Miller, Woodinville, WA (US); Philip Robinson, Seattle, WA (US); Scott Phillip Selfon, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/530,890

(22) Filed: Dec. 6, 2023

(65) Prior Publication Data

US 2024/0105156 A1 Mar. 28, 2024

Related U.S. Application Data

(63) Continuation of application No. 17/702,739, filed on Mar. 23, 2022, now Pat. No. 11,869,475, which is a (Continued)

(51) Int. Cl.
*G10K 11/178* (2006.01)
*H04R 1/40* (2006.01)

(52) U.S. Cl.
CPC .. *G10K 11/17827* (2018.01); *G10K 11/17823* (2018.01); *H04R 1/406* (2013.01); (Continued)

(58) Field of Classification Search
CPC ....... G10K 11/17827; G10K 11/17823; G10K 2210/1081; G10K 2210/111; (Continued)

(56) References Cited

U.S. PATENT DOCUMENTS 5,647,011 A * 7/1997 Garvis .................. H03G 3/342 381/74
8,189,803 B2 * 5/2012 Bergeron ......... G10K 11/17837 381/74
(Continued)

FOREIGN PATENT DOCUMENTS

CN 105976829 A 9/2016
CN 106062746 A 10/2016
(Continued)

OTHER PUBLICATIONS

Extended European Search Report for European Application No. 18937627.0, mailed Nov. 17, 2021, 7 pages.
(Continued)

*Primary Examiner* — Oyesola C Ojo
(74) *Attorney, Agent, or Firm* — Greenberg Traurig, LLP

(57) ABSTRACT

The disclosed computer-implemented method may include applying, via a sound reproduction system, sound cancellation that reduces an amplitude of various sound signals. The method further includes identifying, among the sound signals, an external sound whose amplitude is to be reduced by the sound cancellation. The method then includes analyzing the identified external sound to determine whether the identified external sound is to be made audible to a user and, upon determining that the external sound is to be made audible to the user, the method includes modifying the sound cancellation so that the identified external sound is made audible to the user. Various other methods, systems, and computer-readable media are also disclosed.

20 Claims, 8 Drawing Sheets

Related U.S. Application Data continuation of application No. 16/861,943, filed on Apr. 29, 2020, now Pat. No. 11,315,541, which is a continuation of application No. 16/171,389, filed on Oct. 26, 2018, now Pat. No. 10,679,602.

(52) U.S. Cl.
CPC ................ *G10K 2210/1081* (2013.01); *G10K 2210/111* (2013.01); *G10K 2210/3044* (2013.01); *G10K 2210/3046* (2013.01); *G10K 2210/3056* (2013.01)

(58) Field of Classification Search
CPC ... G10K 2210/3044; G10K 2210/3046; G10K 2210/3056; G10K 11/17837; G10K 11/178; H04R 1/406; H04R 1/1083; H04R 3/002; H04R 2460/01
See application file for complete search history.

(56) References Cited

U.S. PATENT DOCUMENTS

| | | | | |
|---|---|---|---|---|
| 9,691,413 | B2* | 6/2017 | Zad Issa | G10L 21/0388 |
| 9,716,939 | B2 | 7/2017 | Di Censo et al. | |
| 10,679,602 | B2 | 6/2020 | Lovitt et al. | |
| 2001/0046304 | A1* | 11/2001 | Rast | H04R 1/1083 381/26 |
| 2002/0141599 | A1* | 10/2002 | Trajkovic | G10K 11/17873 381/72 |
| 2004/0015365 | A1* | 1/2004 | Ohmori | G10L 15/22 704/E15.04 |
| 2006/0083387 | A1 | 4/2006 | Emoto | |
| 2007/0291959 | A1* | 12/2007 | Seefeldt | H03G 9/025 381/104 |
| 2008/0187148 | A1* | 8/2008 | Itabashi | G10K 11/17857 381/71.6 |
| 2008/0267416 | A1* | 10/2008 | Goldstein | H04R 3/00 381/56 |
| 2013/0070931 | A1 | 3/2013 | Hetherington | |
| 2013/0156212 | A1* | 6/2013 | Bjelosevic | G10K 11/17885 381/71.1 |
| 2014/0044269 | A1* | 2/2014 | Anderson | H04R 1/1083 381/57 |
| 2014/0079235 | A1* | 3/2014 | Lyons | G10K 11/17873 381/71.6 |
| 2014/0126733 | A1* | 5/2014 | Gauger, Jr | G10K 11/1783 381/71.6 |
| 2014/0172426 | A1* | 6/2014 | Aratsu | G10L 21/0208 704/235 |
| 2015/0294662 | A1* | 10/2015 | Ibrahim | G10K 11/17823 381/71.6 |
| 2016/0005422 | A1* | 1/2016 | Zad Issa | H03G 3/32 704/226 |
| 2016/0165336 | A1 | 6/2016 | Di Censo et al. | |
| 2016/0267925 | A1 | 9/2016 | Nomura | |
| 2017/0345408 | A1* | 11/2017 | Hong | G10K 11/17873 |
| 2018/0260187 | A1* | 9/2018 | Yasuda | H04M 11/06 |
| 2018/0268823 | A1* | 9/2018 | Miura | G06F 16/635 |
| 2018/0296092 | A1* | 10/2018 | Hassan | G16H 50/20 |
| 2020/0380979 | A1* | 12/2020 | Meacham | G10L 21/0208 |
| 2022/0021985 | A1* | 1/2022 | Wexler | G10L 25/51 |

FOREIGN PATENT DOCUMENTS

| | | | |
|---|---|---|---|
| EP | 1646265 | A2 | 4/2006 |
| JP | 2000181498 | A | 6/2000 |
| JP | 2004526375 | A | 8/2004 |
| JP | 2006093792 | A | 4/2006 |
| JP | 2007243493 | A | 9/2007 |
| JP | 2007279975 | A | 10/2007 |
| JP | 2015198413 | A | 11/2015 |
| JP | 2016025469 | A | 2/2016 |
| JP | 2016170405 | A | 9/2016 |
| JP | 2017528990 | A | 9/2017 |
| KR | 20100120567 | A | 11/2010 |
| KR | 101612092 | B1 | 4/2016 |
| KR | 20160069475 | A | 6/2016 |
| KR | 20170097159 | A | 8/2017 |
| WO | 2016105455 | A1 | 6/2016 |
| WO | 2020086104 | A1 | 4/2020 |

OTHER PUBLICATIONS

First Action Interview Office Action Summary mailed Nov. 14, 2019 for U.S. Appl. No. 16/171,389, filed Oct. 26, 2018, 8 Pages.
International Preliminary Report on Patentability for International Application No. PCT/US2018/066946, mailed May 6, 2021, 7 Pages.
International Search Report and Written Opinion for International Application No. PCT/US2018/066946, mailed Jul. 15, 2019, 8 Pages.
Notice of Allowance mailed Jan. 29, 2020 for U.S. Appl. No. 16/171,389, filed Oct. 26, 2018, 31 Pages.
Notification of the First Office Action mailed Jan. 6, 2022 for Chinese Application No. 201880099008.4, filed Dec. 20, 2018, 13 pages.
Office Action mailed Jul. 24, 2023 for European Patent Application No. 18937627.0, filed on Dec. 20, 2018, 6 pages.
Office Action mailed May 25, 2023 for Korean Application No. 10-2021-7015619, filed Dec. 20, 2018, 3 pages.
Office Action mailed Jun. 27, 2023 for Japanese Patent Application No. 2021-507925, filed on Feb. 16, 2021, 10 pages.
Office Action mailed Sep. 27, 2022 for Japanese Patent Application No. 2021507925, filed on Feb. 16, 2021, 18 pages.
Office Action mailed Oct. 28, 2022 for Korean Application No. 10-2021-7015619, filed Dec. 20, 2018, 11 pages.
Preinterview First Office Action mailed Oct. 1, 2019 for U.S. Appl. No. 16/171,389, filed Oct. 26, 2018, 20 Pages.
European Search Report for European Patent Application No. 24189738.8, dated Feb. 19, 2025, 7 pages.

* cited by examiner

ADAPTIVE ANC BASED ON ENVIRONMENTAL TRIGGERS

CROSS REFERENCE TO RELATED APPLICATION

This application is a continuation of U.S. application Ser. No. 17/702,739 filed on 23 Mar. 2022, which is a continuation of U.S. application Ser. No. 16/861,943, filed on 29 Apr. 2020 which is a continuation of U.S. application Ser. No. 16/171,389, filed on 26 Oct. 2018, the disclosure of which is incorporated, in its entirety, by this reference.

BACKGROUND

Active noise cancellation (ANC) is often used in ear phones and other electronic devices to cancel the noise surrounding a user. For example, users often wear headphones equipped with ANC on airplanes to drown out noise from the jet engines, as well as remove sounds from nearby passengers. Active noise cancellation typically operates by listening to external sounds, and then generating a noise cancellation signal that is 180 degrees out of phase with the actual background noise. When the ANC signal and the external sounds are combined, the external sounds are muted or at least greatly muffled.

In typical ANC applications, users will turn on the ANC function, and leave it on until they are done wearing the headset. For example, if a user is mountain biking or road biking, the user may wear ANC head phones or ear buds that allow the user to listen to music, while having outside sounds muted entirely or greatly reduced. In such an example, the user would normally typically leave the ANC feature running for the duration of the bike ride. During this ride, however, the user may miss some sounds that are important for the user to hear such as a car horn or train whistle.

SUMMARY

As will be described in greater detail below, the instant disclosure describes modifying active noise cancellation based on environmental triggers. In cases where certain external noises should reach the user, the embodiments herein may modify active noise cancellation to allow those external sounds through to reach the user. It should be noted that throughout this document, the terms “noise cancellation,” “active noise cancellation,” or “sound cancellation” may each refer to methods of reducing any type of audible noise or sound.

In one example, a computer-implemented method for modifying active noise cancellation based on environmental triggers may include applying, via a sound reproduction system, noise cancellation that reduces an amplitude of various sound signals. The method may further include identifying, among the sound signals, an external sound whose amplitude is to be reduced by active noise cancellation. The method may then include analyzing the identified external sound to determine whether the identified external sound is to be made audible to a user and, upon determining that the external sound is to be made audible to the user, the method may include modifying the active noise cancellation so that the identified external sound is made audible to the user.

In some examples, modifying the active noise cancelling signal includes increasing audibility of the identified external sound. Increasing audibility of the identified external sound may include compressing the modified active noise cancelling signal, so that the modified active noise cancelling signal is played back in a shortened timeframe. Additionally or alternatively, increasing the audibility of the identified external sound may include increasing volume along a specified frequency band.

In some examples, the identified external sound may include various words, or a specific word or phrase. In some examples, the method may further include detecting which direction the identified external sound originated from and presenting the identified external sound to the user as coming from the detected direction. In some examples, the active noise cancelling signal may be further modified to present subsequently occurring audio from the detected direction.

In some examples, policies may be applied when determining that the external sound is to be made audible to the user. In some examples, the identified external sound may be ranked according to level of severity. In some examples, the active noise cancelling signal may be modified upon determining that the identified external sound has a minimum threshold level of severity.

In some examples, the method for modifying active noise cancellation based on environmental triggers may further include receiving an indication that an event has occurred within a specified distance of the user and determining that the event is pertinent to the user. Then, based on the determination that the event is pertinent to the user, the active noise cancelling signal may be modified to allow the user to hear external sounds coming from the site of the event. In some examples, microphones configured to listen to the external sounds may be directionally oriented toward the event.

In some examples, the method may further include determining that another electronic device within a specified distance of the system has detected an external sound that is pertinent to the user. The method may then include determining a current position of the other electronic device, and physically or digitally orienting (i.e., beamforming) microphones configured to listen to the external sounds toward the determined position of the electronic device.

In some examples, modifying the active noise cancelling signal may include continuing to apply active noise cancelling to external sounds received from multiple locations, while disabling active noise cancelling for external sounds received from a specified location. In some examples, modifying the active noise cancelling signal may include continuing to apply active noise cancelling to external sounds received from a specific person, while disabling active noise cancelling for external sounds received from other persons.

In some examples, modifying the active noise cancelling signal may include disabling active noise cancelling for specific words detected in the external sounds, while continuing to apply active noise cancelling to other words. For instance, a listening user may be wearing an augmented reality (AR) headset and an external user may say “barge in” and the external user’s next phrase may be transmitted to the listening user while subsequent phrases from the external user are noise cancelled. In some examples, modifying the active noise cancelling signal may include temporarily pausing active noise cancelling, and resuming active noise cancelling after a specified amount of time. In some examples, the sound reproduction system may further include a microphone for playing back the modified active noise cancelling signal to the user.

In addition, a corresponding system for modifying active noise cancellation based on environmental triggers may include several modules stored in memory, including a sound reproduction system configured to apply noise cancellation that reduces an amplitude of various noise signals. The system may also include an external sound identifying module that identifies, among the noise signals, an external sound whose amplitude is to be reduced by the noise cancellation. A sound analyzer may analyze the identified external sound to determine whether the identified external sound is to be made audible to a user and, upon determining that the external sound is to be made audible to the user, an ANC modification module may modify the noise cancellation so that the identified external sound is made audible to the user.

In some examples, the above-described method may be encoded as computer-readable instructions on a computer-readable medium. For example, a computer-readable medium may include one or more computer-executable instructions that, when executed by at least one processor of a computing device, may cause the computing device to apply, via a sound reproduction system, noise cancellation that reduces an amplitude of noise signals, identify, among the noise signals, an external sound whose amplitude is to be reduced by the noise cancellation, analyze the identified external sound to determine whether the identified external sound is to be made audible to a user and, upon determining that the external sound is to be made audible to the user, modify the noise cancellation such that the identified external sound is made audible to the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
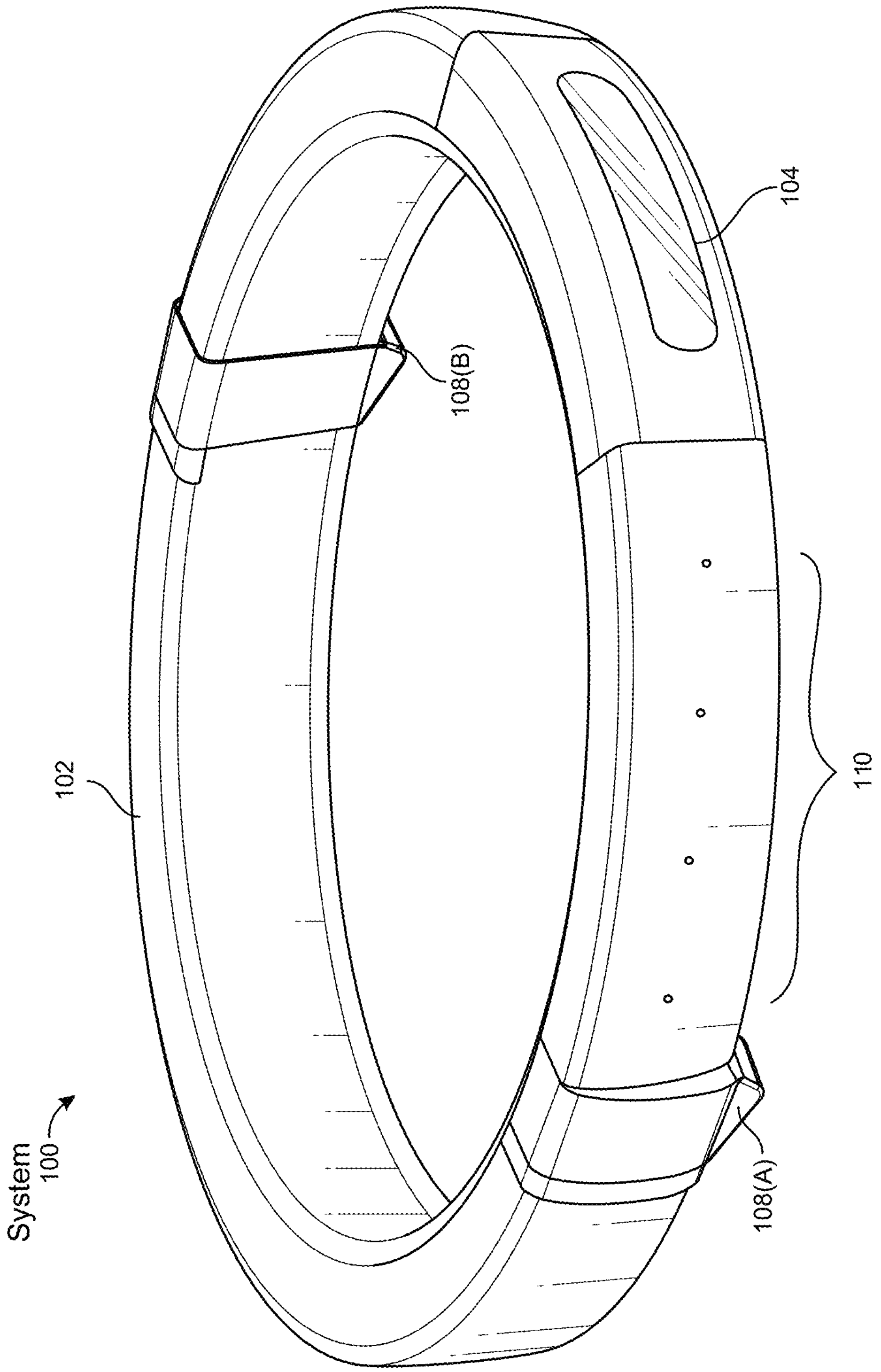
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to modifying active noise cancellation based on environmental triggers. As will be explained in greater detail below, embodiments of the instant disclosure may determine that an external sound is of sufficient importance that it should be presented to a user, even if the user has turned on noise cancellation. For example, the user may be in harm's way and a bystander may be yelling at the user to move. The embodiments described herein may determine that the yells directed to the user are important for the user to hear, and that they should be presented to the user. As such, the embodiments herein may temporarily stop the noise cancellation process or may modify the noise cancellation signal so that the yelling (or other important sounds) reach the user. As noted above, active noise cancellation may be any type of operation that reduces noises or sound signals. Accordingly, the terms "noise cancellation" and "sound cancellation" may be used synonymously herein.

In current active noise cancellation (ANC) implementations, ANC may be turned on and left on. Traditional systems may not implement logic to determine whether or not to apply ANC. Rather, the user simply turns the feature on, and ANC continues to operate until it is turned off. Accordingly, users with ANC-enabled headphones may not hear sounds that would be important for them to hear. For example, if the user is in the woods and a bear is growling, a traditional ANC system may mute the sound of the bear's growl. In contrast, the embodiments herein may determine that the bear growl is sufficiently important to the user that ANC should be cancelled or subdued for a period of time. Moreover, some words or phrases such as "Look out!" or "Fire" may be sufficiently important that they should be presented to the user. Accordingly, the embodiments herein may allow the user to safely use ANC-enabled audio reproduction devices in a variety of different environments without having to worry about missing an important sound.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

Figure 2:
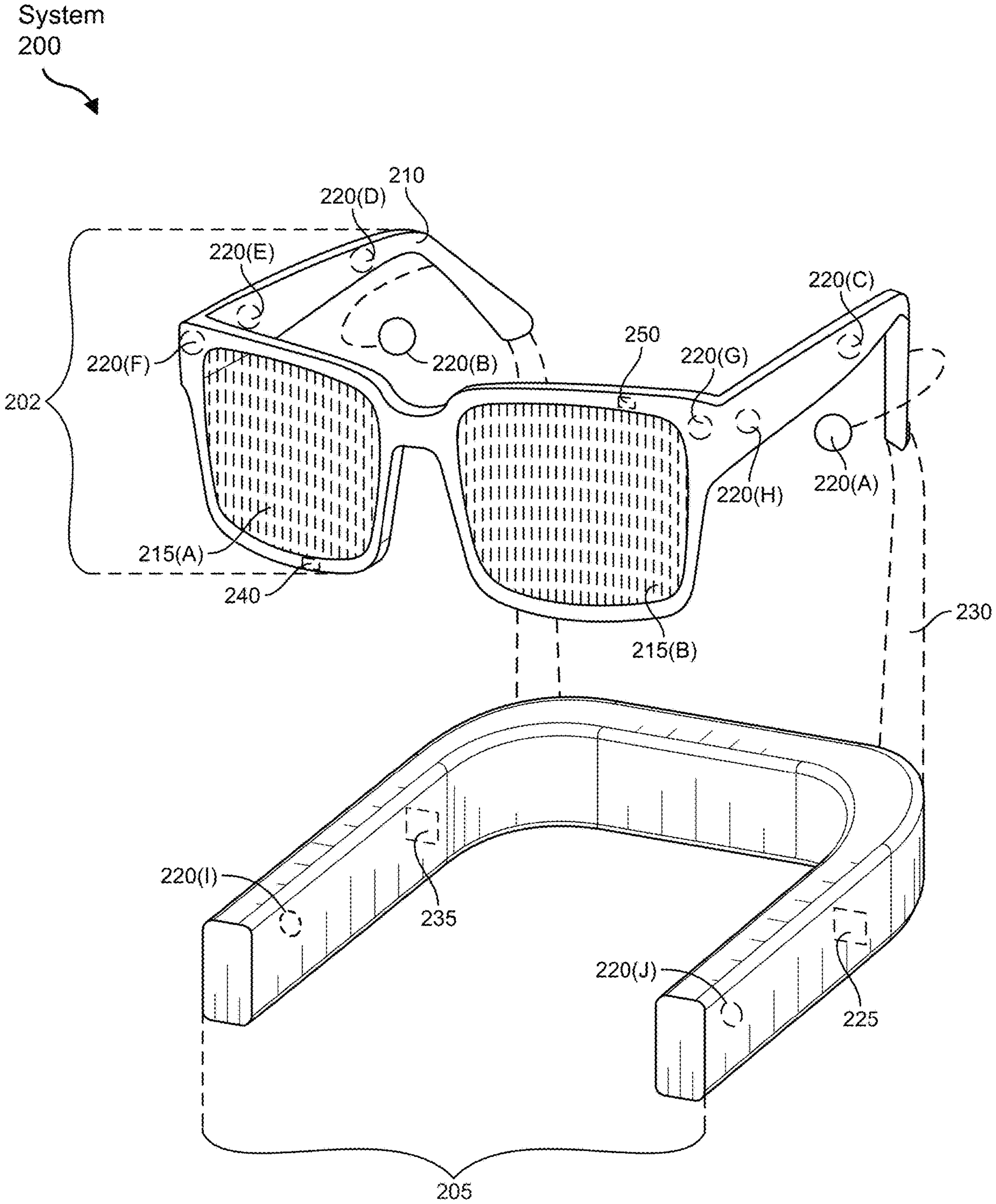
FIG. 2 illustrates an embodiment of an augmented reality headset and corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing the AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to the AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between the neckband acoustic sensors 220(I) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a DoA estimation to estimate a direction from which the detected sound arrived at the microphone array. As the microphone array detects sounds, controller 225 may populate an audio data set with the information. In embodiments in which AR system 200 includes an inertial measurement unit, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
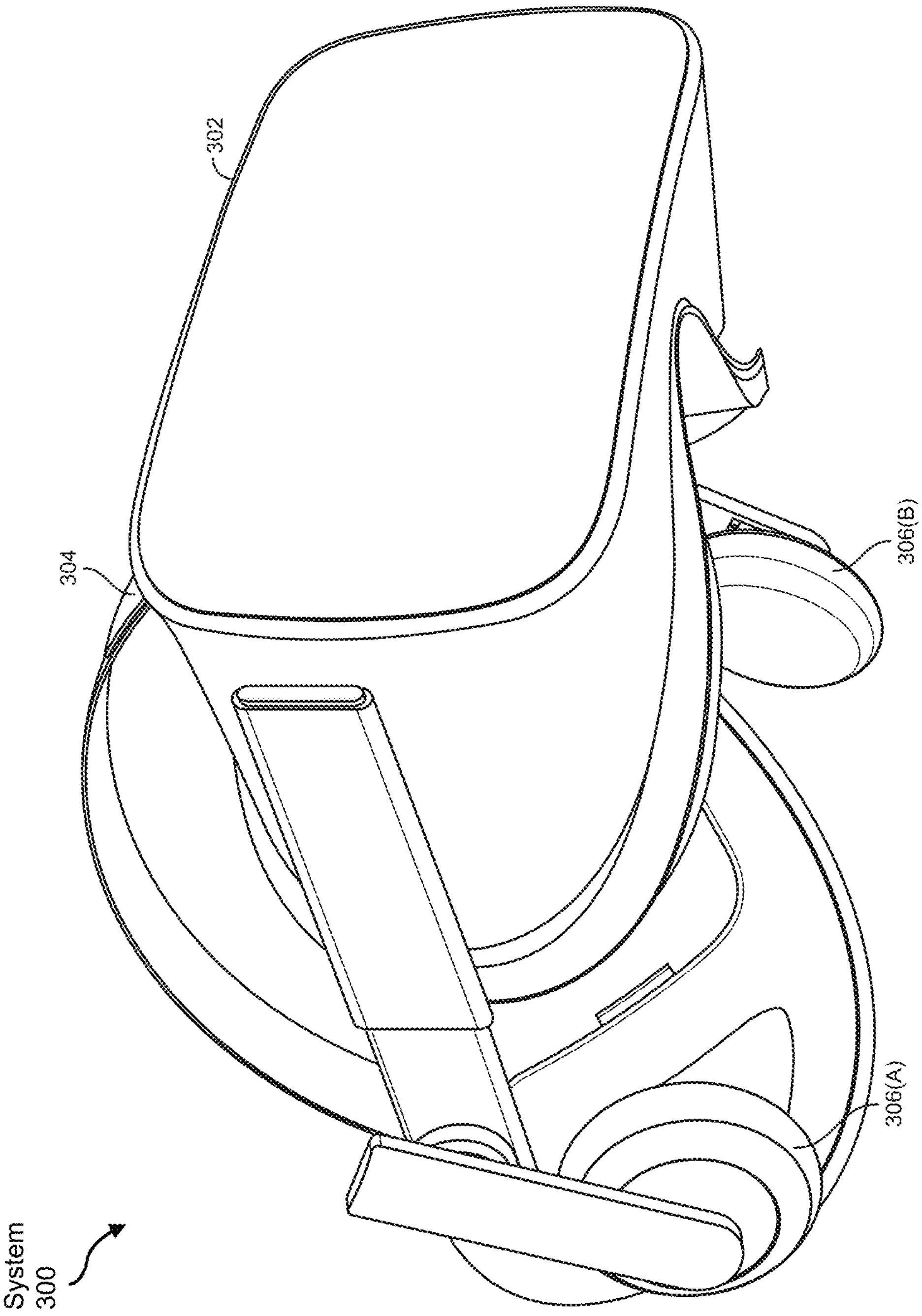
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1 and 2, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a direction of arrival (DOA) analysis to determine the location of a sound source. The DOA analysis may include analyzing the intensity, spectra, and/or arrival time of each sound at the AR/VR device to determine the direction from which the sounds originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an artificial reality device may implement one or more microphones to listen to sounds within the user's environment. The AR or VR headset may use a variety of different array transfer functions (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, IR sensors, heat sensors, motion sensors, GPS receivers, or in some cases, sensor that detect a user's eye movements. For example, as noted above, an artificial reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to the user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 4:
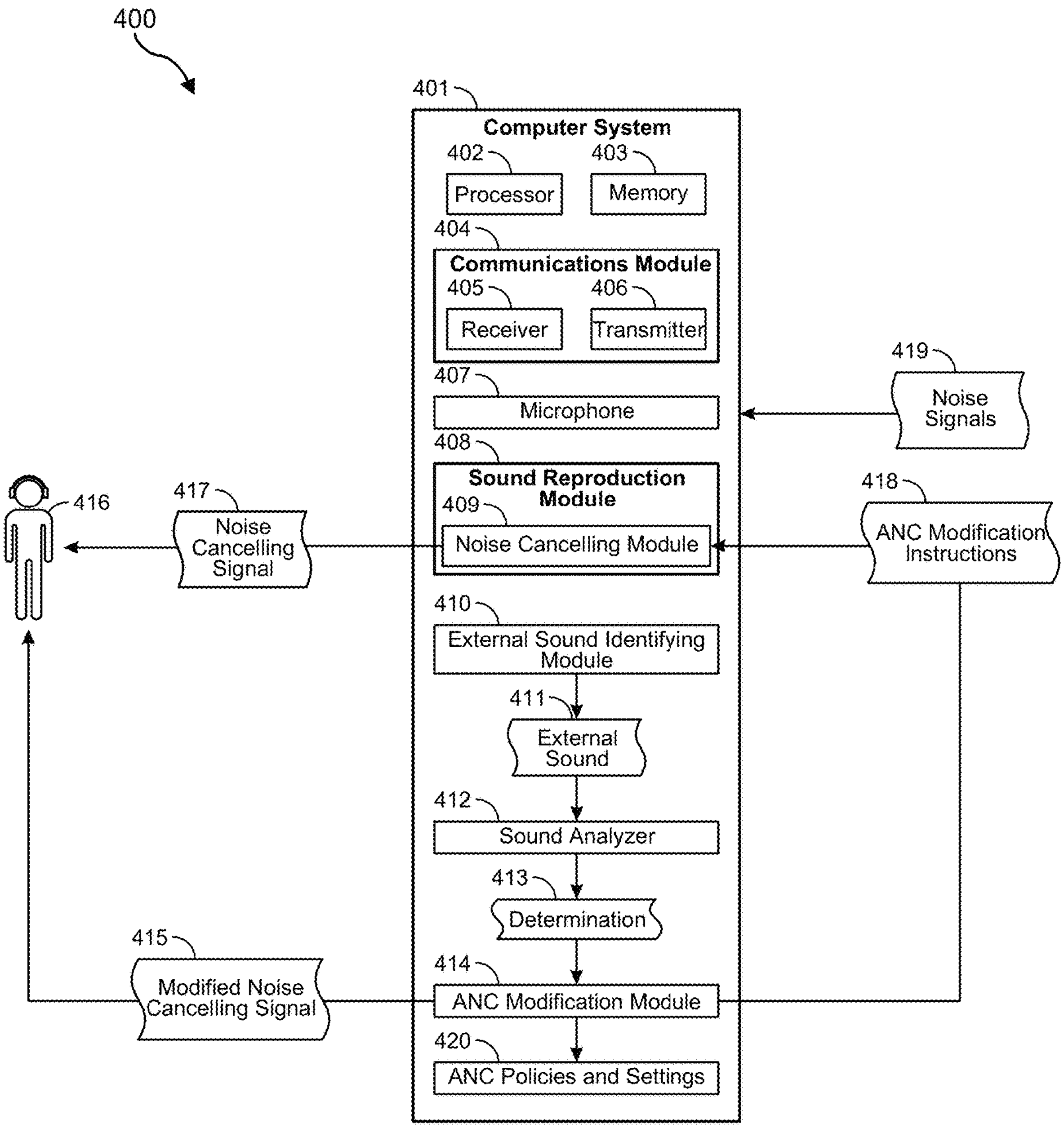
FIG. 4 illustrates a computing environment in which the embodiments described herein may operate including modifying active noise cancellation based on environmental triggers.

The following will provide, with reference to FIGS. 4-11, detailed descriptions of how active noise cancellation may be modified based on environmental triggers. FIG. 4, for example, illustrates a computing architecture 400 in which many of the embodiments described herein may operate. The computing architecture 400 may include a computer system 401. The computer system 401 may include at least one processor 402 and at least some system memory 403. The computer system 401 may be any type of local or distributed computer system, including a cloud computer system. The computer system 401 may include program modules for performing a variety of different functions. The program modules may be hardware-based, software-based, or may include a combination of hardware and software. Each program module may use or represent computing hardware and/or software to perform specified functions, including those described herein below.

For example, communications module 404 may be configured to communicate with other computer systems. The communications module 404 may include any wired or wireless communication means that can receive and/or transmit data to or from other computer systems. These communication means may include radios including, for example, a hardware-based receiver 405, a hardware-based transmitter 406, or a combined hardware-based transceiver capable of both receiving and transmitting data. The radios may be WIFI radios, cellular radios, Bluetooth radios, global positioning system (GPS) radios, or other types of radios. The communications module 404 may be configured to interact with databases, mobile computing devices (such as mobile phones or tablets), embedded systems, or other types of computing systems.

The computer system 401 may also include a microphone 407. The microphone 407 may be configured to listen for sounds outside the computer system including noise signals 419. These noise signals 419 may include any type of sounds including music, voices, conversations, street noises or other forms of audio. In the embodiments herein, substantially any type of audio data may be referred to as "noise" that is to be filtered out using active noise cancellation. The noise cancelling may be performed by the noise cancelling module 409 of the sound reproduction module 408 in computer system 401. The sound reproduction module 408 may be its own sound reproduction system, separate from computer system 401, or may be a module within computer system 401. The sound reproduction module 408 may generate speaker signals that drive speakers heard by the user 416. For instance, the sound reproduction module 408 may provide an audio signal to the user's head phones or external speakers. The noise cancelling signal 417 generated by the noise cancelling module 409 may include the audio signal along with a separate noise cancelling signal. These two signals are then combined, such that the noise cancelling signal 417 cancels out the noise signals 419 and the user hears only the audio signal.

Still further, the computer system 401 may include an external sound identifying module 410. The external sound identifying module 410 may identify one or more external sounds 411 within the noise signals 419. The noise signals may come from an outdoor environment, an indoor environment, an environment crowded with people, or an environment substantially devoid of people. The noise signals 419 may include words spoken by a person or other sounds such as sirens, car honks, people yelling, etc. that may be important for the user 416 to hear.

The sound analyzer 412 of computer system 401 may analyze these external sounds 411 and make a determination 413 as to whether the sounds are important enough to disrupt active noise cancellation and present the sounds to the user 416. If the determination 413 is yes, then the ANC modification module 414 may modify the noise cancelling signal 415 directly or may send ANC modification instructions 418 to the noise cancelling module 409 so it can generate a modified noise cancelling signal. The modified noise cancelling signal 415 may cause noise cancelling to cease altogether, or may cause noise cancelling to be paused temporarily, or may cause noise cancelling to be subdued for a period of time. With the noise cancelling signal modified in this manner, the user 416 should be able to hear the external sounds 411 that were identified as being important for the user to hear. These embodiments will be described in greater detail with regard to method 400 of FIG. 4 and FIGS. 3-8.

Figure 5:
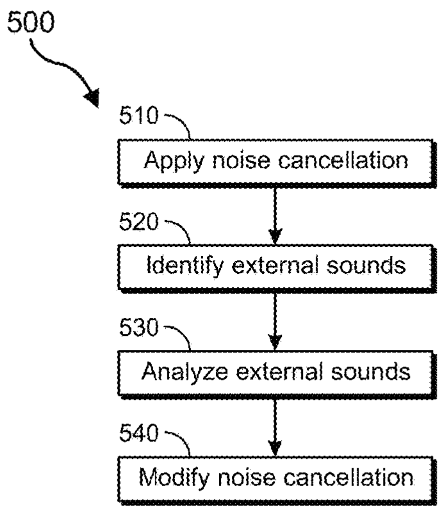
FIG. 5 illustrates a flow diagram of an exemplary method for modifying active noise cancellation based on environmental triggers.
Figure 6:
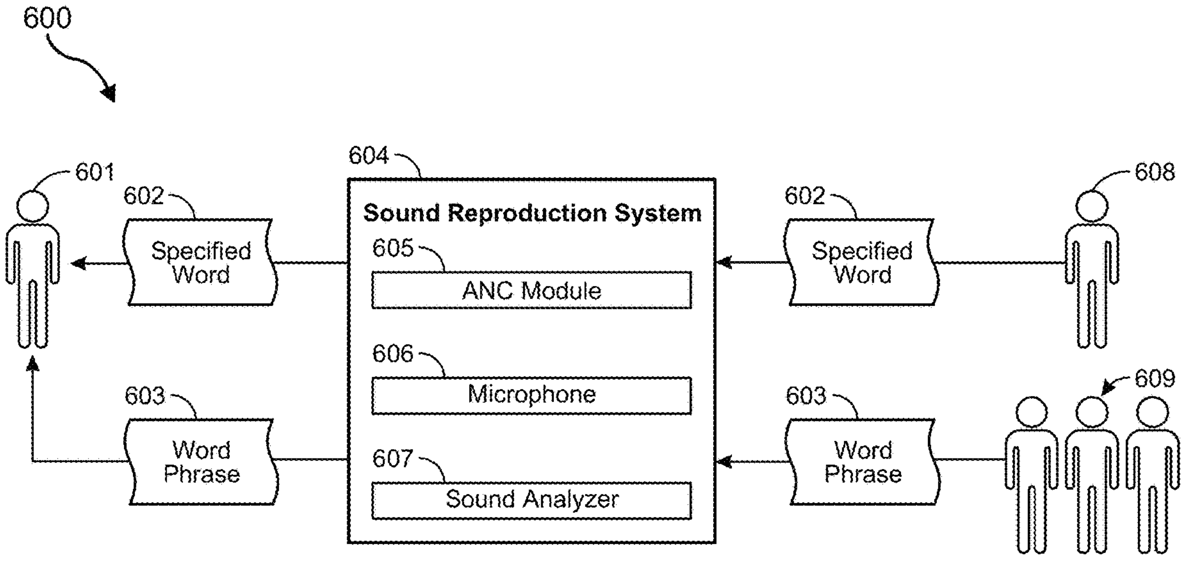
FIG. 6 illustrates an alternative computing environment in which active noise cancellation may be modified based on environmental triggers.

FIG. 5 is a flow diagram of an exemplary computer-implemented method 500 for modifying active noise cancellation based on environmental triggers. The steps shown in FIG. 5 may be performed by any suitable computer-executable code and/or computing system, including the system(s) illustrated in FIG. 5. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may apply, via a sound reproduction system, noise cancellation that reduces an amplitude of one or more noise signals. For example, the sound reproduction module 408 of computer system 401 may apply noise cancellation 417 that reduces the amplitude of the noise signals 419. As noted above, the sound reproduction module 408 may be its own stand-alone system or device or may be part of the computer system 401. The sound reproduction module 408 may include a noise cancelling module 409 that generates a noise cancelling signal 417 based on the noise detected in the noise signals 419. For example, a microphone 407 on the computer system 401 may detect many different noise signals 419. These noise signals may include words, conversations, sounds from machines including cars or airplanes, outdoor sounds or other noises. Many of these noises may be unimportant to the user 416 and may be filtered out via the noise cancelling signal 417. In some cases, however, one or more of the sounds within the noise signals 419 may be important for the user to hear.

As the terms are used herein, "important" or "pertinent" may refer to external sounds that may be interesting or useful or perhaps necessary for the user's safety. Thus, a sound deemed to be pertinent or important to the user may be any sound that should be passed on to the user 416. Various types of logic, algorithms, machine learning or other steps may be taken to determine which sounds are important for the user to hear. For example, machine learning or neural networks may use various algorithms to identify vocal patterns, vocal strain, tone of voice, specific words, specific users who are speaking, or identify other vocal characteristics. Over time, millions of sounds may be identified and categorized by the machine learning algorithms as being potentially important to users or as being innocuous. When such external sounds are identified, noise cancelling may be cancelled or modified so that the external sounds are presented to the user 416.

The method 500 further includes identifying, among the noise signals 419, an external sound 411 whose amplitude is to be reduced by the noise cancellation (step 520). As mentioned above, many different external sounds may be included in the noise signals 419. Each of these external sounds may be separately identified by module 410 and analyzed by the sounds analyzer 412 to determine whether the sound should be heard by the user 416. Such sounds may include ambulance sirens, cars honking, people yelling, certain words or phrases such as "Stop," or "Help," animal noises including growling or barking, or other sounds that would be important for the user to hear.

At step 530 of FIG. 5, the sound analyzer 412 may analyze the identified external sound 411 to determine whether the identified external sound is to be made audible to user 416 (step 530). If the sound analyzer 412 determines that the sound is not to be made available to the user, then noise cancellation continues. If the sound analyzer 412 determines that the external sound is to be made audible to the user 416, the ANC modification module 414 may modify the noise cancellation so that the identified external sound is made audible to the user (step 540). The ANC modification module 414 may modify the noise cancelling signal 415 so that the identified external sound 411 is heard by the user. The ANC modification may include reducing the level of active noise cancellation, temporarily pausing active noise cancellation, or turning off ANC entirely.

In some embodiments, modifying the active noise cancelling signal 415 may include increasing audibility of the identified external sound. For instance, if the identified external sound 411 is important enough to modify or remove ANC, the embodiments herein may take additional steps to ensure that the external sound 411 is heard more clearly. One such step may be increasing the volume of the external sound so that it is more easily heard by the user 416. Additionally or alternatively, the ANC modification module may increase audibility of the identified external sound by compressing the modified active noise cancelling signal, so that the modified active noise cancelling signal is played back in a shortened timeframe. The shortened playback may provide the external sound 411 in a short burst that is quickly recognizable by the user. In still other cases, increasing the audibility of the identified external sound may include increasing the volume along a specified frequency band. For instance, if the external sound 411 is a spoken word or series of words, frequencies within the frequency band from around 300 Hz to 3000 Hz may be amplified to provide greater volume to the spoken words. Other, non-amplified frequencies may also be attenuated to provide even greater clarity to the spoken words.

In some embodiments, the identified external sound 411 may be a specific word or phrase. For instance, as shown in computing environment 600 of FIG. 6, a speaking user 608 may speak a specific word 602 that is detected by a microphone 606 of the sound reproduction system 604. The sound analyzer 607 of the sound reproduction system 604 may determine that the specific word 602 (e.g., "Move!") is one that is pertinent to the user 601. Thus, the ANC module 605 may modify active noise cancellation so that the word 602 reaches the user 601.

Similarly, if a user or group of speaking users (e.g., 609) utters a word phrase 603 that is pertinent to the user 601, the sound analyzer 607 may detect the word phrase and the ANC module 605 may modify the active noise cancelling to allow the word phrase 603 to reach the user 601. In some embodiments, a list of specific words or word phrases may be stored in a data store that is local to or remote from the sound reproduction system 604. This list of words or phrases may include those that are pertinent to the user 601. This list may be compiled by the user 601 or updated by the user. Alternatively, the list may be generic for all users. In still other cases, the list of words or phrases may be dynamic such that specific words or phrases may have more importance to a user in certain situations or in certain locations, while in other locations that word can be safely muted through active noise cancellation. Policies 420 may be used to determine when certain words or phrases are to be passed through to the user 601.

In some cases, modifying the ANC may include disabling active noise cancelling for specific words detected in the external sounds, while continuing to apply active noise cancelling to other words. For example, if the speaking user 608 is providing a continuous stream of words, the sound analyzer 607 may identify certain words that are to be passed through to the user 601, and certain words that are to be cancelled via noise cancellation. Thus, the ANC module 606 of the sound reproduction system 604 may disable or temporarily pause active noise cancelling, and then resume active noise cancelling after a specified amount of time (e.g., after the word 602 has been played back to the user). In some examples, the modified ANC signal may be played back to the user 601 via a speaker that is built in to the sound reproduction system 604 or may send a speaker signal to speakers or headsets that are connected to the sound reproduction system.

Figure 7:
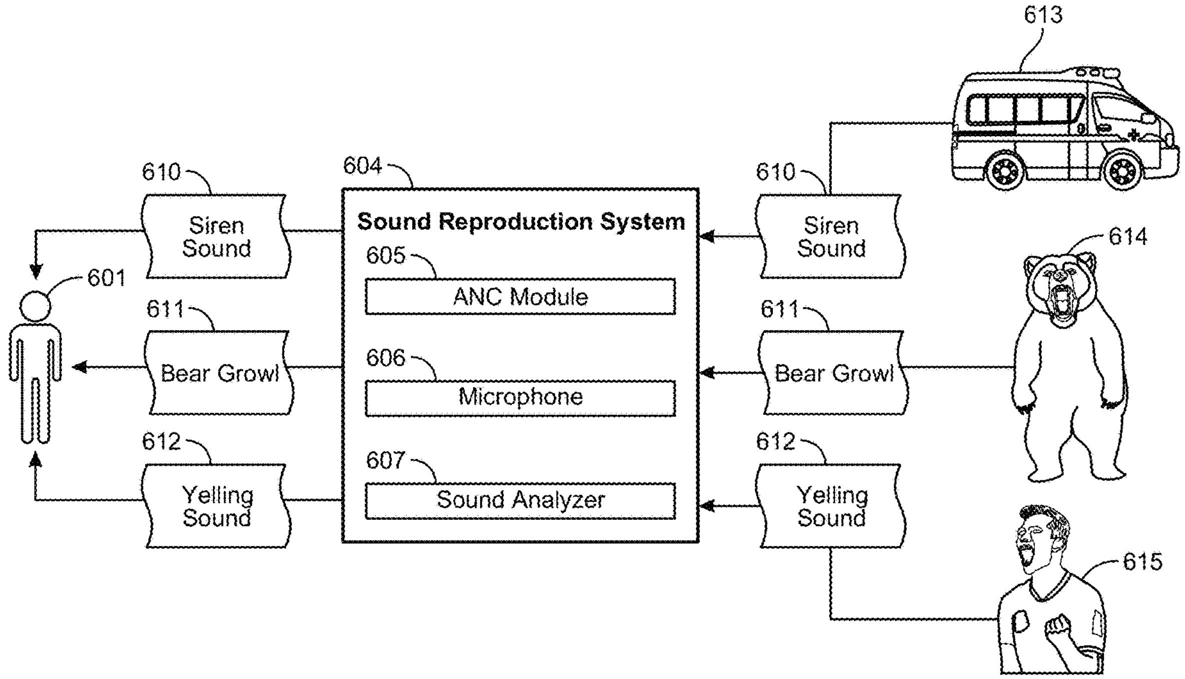
FIG. 7 illustrates an alternative computing environment in which active noise cancellation may be modified based on environmental triggers.

FIG. 7 illustrates embodiments in which specific natural or man-made sounds are recognized and provided back to the user 601. The sound analyzer 604 of the sound reproduction system 604 may be continually or continuously analyzing sounds picked up by the microphone 606. Upon determining that an external sound is sufficiently important to the user 601, the ANC module 605 may modify the audio output to the user 601 so that active noise cancellation is modified or removed. For example, when the sound analyzer 607 detects a siren sound 610 from an ambulance 613, fire truck, police car or other emergency vehicle, the ANC module may modify the active noise cancellation so that the siren sound 610 is passed to the user substantially without any noise cancellation (and possibly with some acoustical enhancements to make the siren louder and clearer).

Similarly, if the user 601 is outdoors and hears a bear 614 growl 611 or snake rattle other animal sound that would be important for the user to hear, the ANC module may modify the active noise cancellation so that the bear growl 611 or other sound is heard by the user 601. Still further, if a person 615 is yelling 612 or crying or screaming, that yelling sound 612 may be analyzed for tone, pitch or stress to indicate that someone is in need or is perhaps angry with the user 601. The sound analyzer 607 may indicate to the ANC module that this yelling sound 612 is serious and is to be passed to the user 601. In some cases, an identified external sound may be internally ranked by the sound reproduction system 604 according to level of severity. Thus, for example, a bear growl 611 may be ranked above a siren sound 610 in severity, or a person yelling may be ranked higher in severity depending on their words or level of strain. In this manner, active noise cancellation may be modified based on how urgent or how severe the external sound is rated. In some cases, active noise cancellation is only modified if there is a minimum level of severity associated with the external sound.

Figure 8:
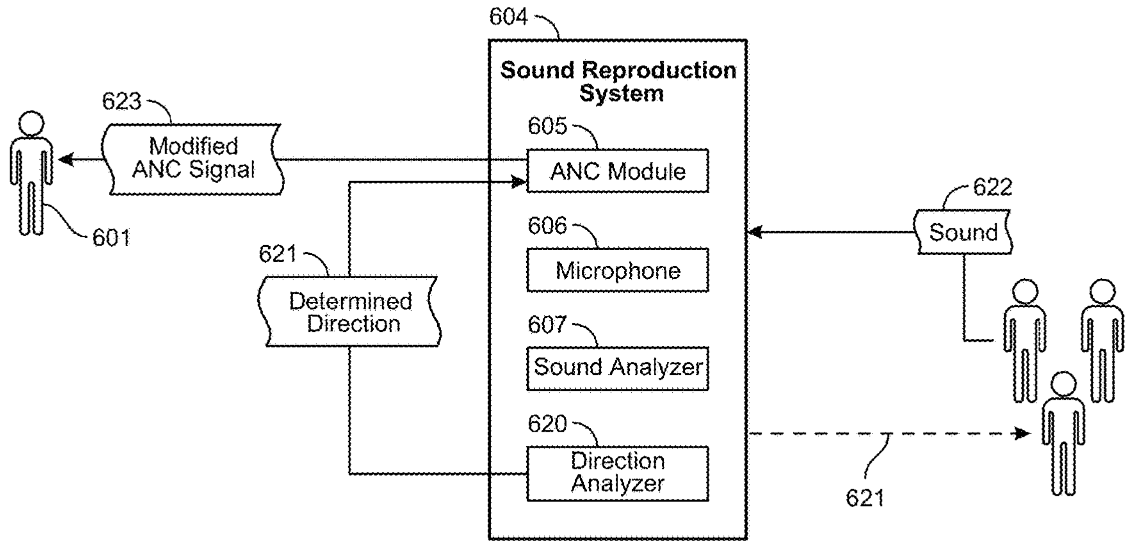
FIG. 8 illustrates an alternative computing environment in which active noise cancellation may be modified based on environmental triggers.

FIG. 8 illustrates an embodiment in which the sound reproduction system 604 includes a direction analyzer 620. The direction analyzer 620 may be configured to detect which direction the identified external sound 622 originated from. For instance, the direction analyzer may analyze signal strength of the sound 622 and determine that the signal is strongest in direction 621. Other means of determining the direction of the identified sound 622, including receiving an indication of location from another electronic device, may also be used. Once the direction 621 is determined, the ANC module 605 may use the direction to modify and present the identified external sound to the user 601 as coming from the detected direction 621. Thus, the modified ANC signal 623 may include audio processing that causes the modified signal to sound as if coming from the direction 621. In some cases, the active noise cancelling signal 623 may be further modified to present subsequently occurring audio as if coming from the detected direction. Thus, once the origin of the external sound 622 has been identified, future external sounds coming from that origin may be presented to the user 601 as if coming from that place of origin, regardless of whether the user moves or reorients their body.

Figure 9:
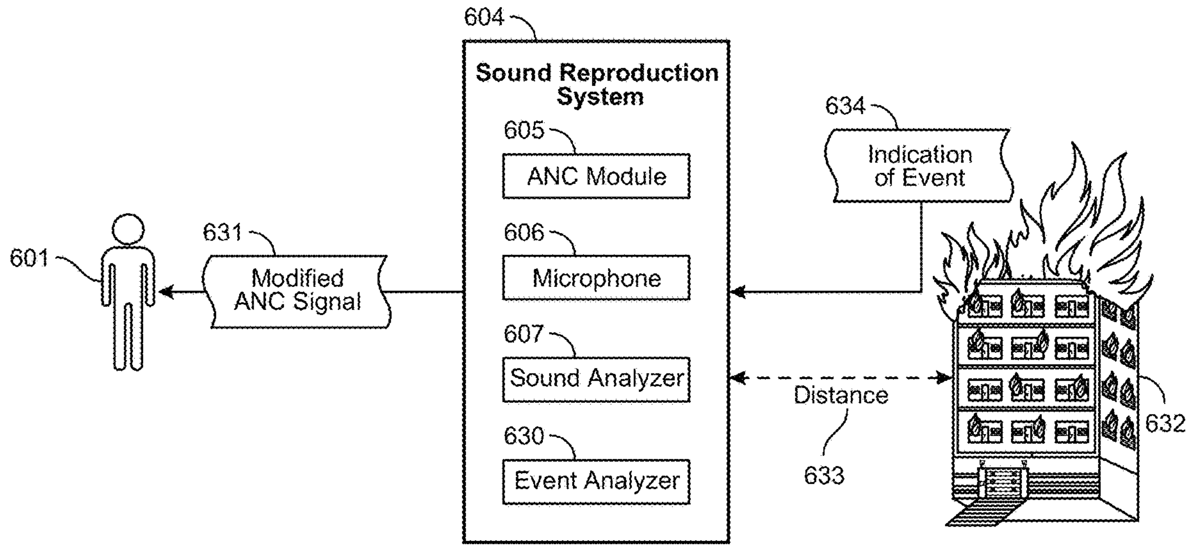
FIG. 9 illustrates an alternative computing environment in which active noise cancellation may be modified based on environmental triggers.

FIG. 9 illustrates an embodiment in which active noise cancellation may be modified based on receiving an indication 634 that an event has occurred within a specified distance 633 of the user 601, and that the event is pertinent to the user. For example, a building 632 may be on fire in the general location the user 601. The event analyzer 630 may determine, from information in the event indication 634, where the event is occurring. The sound reproduction system 604 may include GPS, WiFi, Bluetooth, cellular or other radios that may be used to determine its own location. Thus, using the location of the sound reproduction system 604 and the location of the event (e.g., building 632), the event analyzer 630 can determine a distance 633 to the event. If the user 601 is sufficiently close to the event, then the ANC signal 631 may be modified to pass through sounds coming from the direction of the event. If the distance 633 is too far away, the event analyzer 630 may determine that the event is insufficiently relevant to the user, and the active noise cancellation may continue without interruption. Still further, even in cases where the event is sufficiently close to the user, the event analyzer 630 may determine that the event is not pertinent to the user. Thus, in such cases, audio from the direction of the event may continue to be filtered out through active noise cancellation. As with the listing of words or phrases, the user 601 may specify which events are important to that user, and which events should break the active noise cancellation.

In some cases, the user 601 may be walking or running, or out on a bike or a scooter. As such, the user may pass by multiple different events. For each event that is determined to be pertinent to the user, the ANC module 605 may modify the active noise cancelling signal to allow the user 601 to hear external sounds coming from the site of the event. In some embodiments, the microphone 606 that is configured to listen to the external sounds may be directionally oriented toward the direction of the event. Thus, the microphone itself may be adjusted or actuated to a new position that more clearly captures audio from the event. Alternatively, electronic sound processing may be implemented to directionally focus the microphone 606 on sounds coming from the event.

In some embodiments, different types of electronic equipment (other than microphones) may be used to detect the occurrence of an event near the user. For example, optical sensors including cameras, rangefinders, LiDAR, sonar, or other optical sensors may be used to detect the occurrence of an event. Other sensors may include infrared sensors, temperature sensors, motion sensors, or other sensors that may be configured to identify an event that may be important to a user. As with audio inputs, the event analyzer 630 may be configured to analyze camera or other sensor inputs to detect when an event has occurred. The event analyzer 630 may then determine whether the event is sufficiently relevant to the user. If so, then noise cancellation may be interrupted to allow the user to hear the surrounding audio. If the event is insufficiently relevant, then the active noise cancellation may continue without interruption. Still further, as with the listing of words or phrases, the user 601 may specify which events detected by camera or other sensors are important to that user, and which events should break the active noise cancellation.

Figure 10:
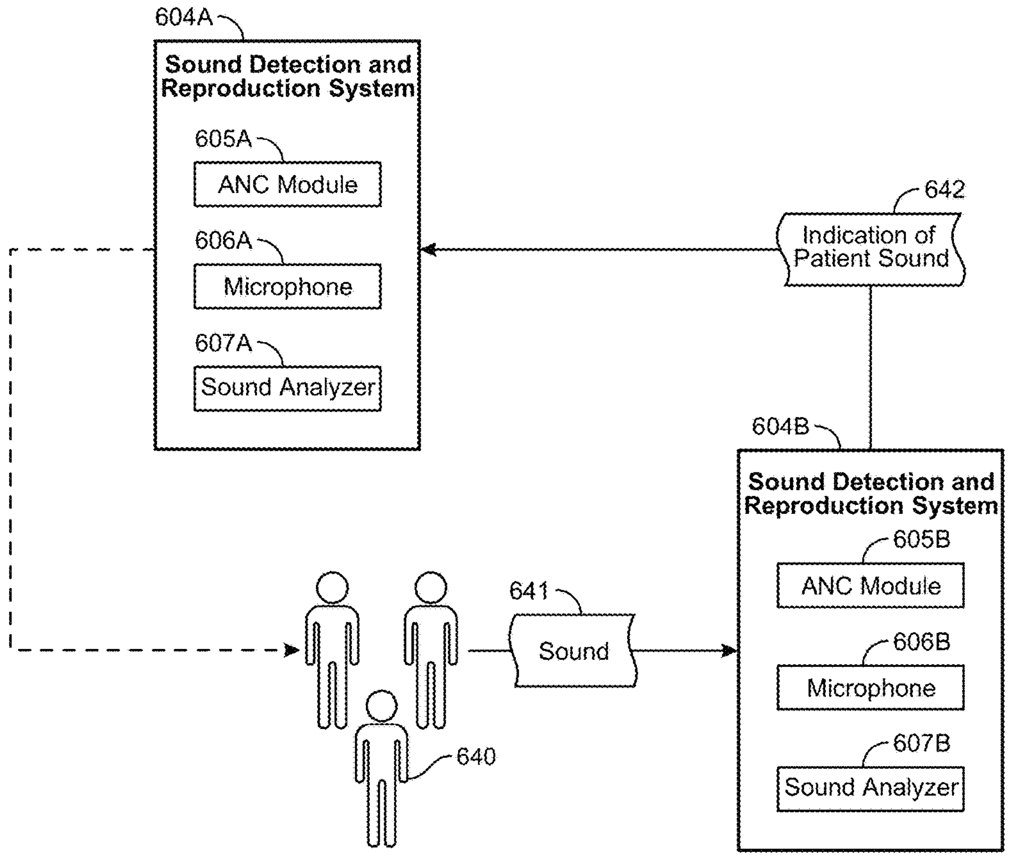
FIG. 10 illustrates an alternative computing environment in which active noise cancellation may be modified based on environmental triggers.

FIG. 10 illustrates an embodiment in which multiple sound detection and reproduction systems are in the same relative location. These sound detection and reproduction systems may communicate with each other using any of the WiFi, Bluetooth or other radios identified above. The sound detection and reproduction systems 604A/604B may indicate to each other that events have occurred that are pertinent for users to hear. For instance, the sound detection and reproduction system 604A may determine that another electronic device within a specified distance of the system has detected an external sound that is pertinent to a user. The sound detection and reproduction system 604B may, for example, send an indication of a pertinent sound 642 to the sound detection and reproduction system 604A. The sound detection and reproduction system 604A may then determine its current position as well as the current position of the other electronic device. The sound detection and reproduction system 604A may then directionally orient its microphone toward the sound detection and reproduction system 604B to listen to the external sounds coming from the direction of the sound detection and reproduction system 604B.

Thus, for example, a group 640 may make a sound 641 near the sound detection and reproduction system 604B. The microphone 606B may detect this sound 641 and use the sound analyzer 607B to determine whether the sound is notable and would be pertinent to other users. The sound detection and reproduction system 604B may then broadcast the indication of a pertinent sound 642 to the sound detection and reproduction system 604A and to other systems or electronic devices. Each sound detection and reproduction system may then separately determine, using its own sound analyzer (e.g., 607A), whether the sound is pertinent and should be presented to a user. Microphones may be directionally oriented toward the location of the sound detection and reproduction system 604B, or to the location identified by the sound detection and reproduction system 604B. Each sound detection and reproduction system's ANC module (e.g., 605A/605B) may then modify the ANC signal accordingly or leave the ANC signal unmodified.

In some embodiments, each sound detection and reproduction system may be connected to or part of an augmented reality (AR) headset (e.g., 100 or 200 of FIG. 1 or 2, respectively) or part of a virtual reality (VR) headset (e.g., 300 of FIG. 3). These headsets may be worn by users in a common room or building. Each of these headsets may communicate with the others their current location within the room or building (or outdoor area). Other communications may include the indications of pertinent sounds 642. Thus, in such a scenario, one AR headset may detect a pertinent sound (e.g., someone yelling) and may broadcast an indication of that sound to others in the room, building or outdoor area. Each user's headset (and corresponding sound reproduction system) may then determine whether the sound is pertinent to that user, and whether ANC is to be modified for that user according to the embodiments described above.

Figure 11:
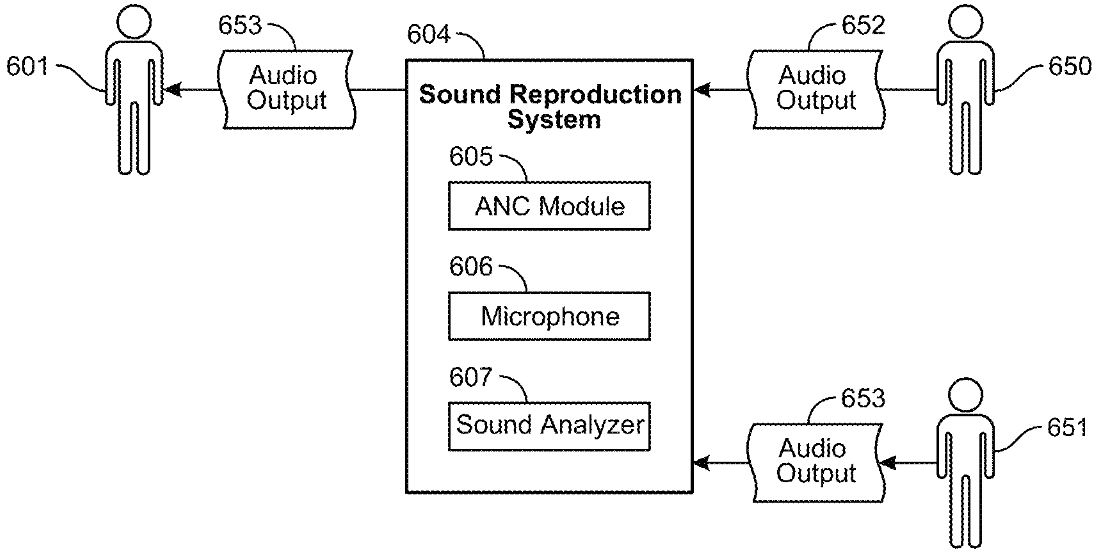
FIG. 11 illustrates an alternative computing environment in which active noise cancellation may be modified based on environmental triggers.

FIG. 11 illustrates an embodiment in which the ANC module 605 modifies the active noise cancelling signal to continue applying active noise cancelling to external sounds received from one person, while disabling active noise cancelling for external sounds received from another person. In FIG. 11, user 650 may be speaking in audio output 652, and user 651 may be speaking in audio output 653. The sound analyzer 607 may determine, based on policy or based on tone of voice or level of vocal strain, that audio output 653 is to be passed to the user 601, while ANC is to continue to be applied to audio output 652 from user 650.

In some cases, a policy may indicate that friends or family are to be given priority, or that screaming or yelling users are to be given priority. For example, the computer system 401 may have access to user 416's contact list or social media account. Such a contact list or social media account may indicate who the user's family or friends are. If the sound analyzer 412 identifies such a family member or friend, the computer system 401 may access a policy regarding ANC for friends and family. The policy or setting (e.g., 420 of FIG. 4) may indicate, for example, that ANC is to be automatically turned off or reduce when friends or family are speaking to the user 416. Other policies may indicate how to control ANC when persons are yelling, or when specific words are detected. These ANC policies and settings 420 may be stored in the computer system 401, or in a remote data store such as a cloud data store. The computer system 401 may access these policies each time a decision is to be made whether to use ANC or not use ANC. Regardless of how the policy decision is made, the sound analyzer 607 may determine that audio output 653 from user 651 is to be played back to the user before audio output 652 is played back to the user. In such cases, the audio output 652 may be stored in a data store and played back for the user 601 at a later time.

In similar fashion, the sound reproduction system 604 may determine that external sounds from a specific location are more important than sounds from another location. In such cases, the ANC module 605 may modify the active noise cancelling signal to continue to apply active noise cancelling to external sounds received from certain locations, while disabling or reducing active noise cancelling for external sounds received from a specific location. Thus, for example, even in a big city where sounds may be received from all directions, the sound reproduction system 604 may be configured to direct the microphone in a specific direction and apply noise cancellation to sounds received from other directions.

In addition, a corresponding system for modifying active noise cancellation based on environmental triggers may include several modules stored in memory, including a sound reproduction system configured to apply noise cancellation that reduces an amplitude of various noise signals. The system may also include an external sound identifying module that identifies, among the noise signals, an external sound whose amplitude is to be reduced by the noise cancellation. A sound analyzer may analyze the identified external sound to determine whether the identified external sound is to be made audible to a user and, upon determining that the external sound is to be made audible to the user, an ANC modification module may modify the noise cancellation so that the identified external sound is made audible to the user.

In some examples, the above-described method may be encoded as computer-readable instructions on a computer-readable medium. For example, a computer-readable medium may include one or more computer-executable instructions that, when executed by at least one processor of a computing device, may cause the computing device to apply, via a sound reproduction system, noise cancellation that reduces an amplitude of noise signals, identify, among the noise signals, an external sound whose amplitude is to be reduced by the noise cancellation, analyze the identified external sound to determine whether the identified external sound is to be made audible to a user and, upon determining that the external sound is to be made audible to the user, modify the noise cancellation such that the identified external sound is made audible to the user.

Accordingly, using the embodiments herein, users may confidently use active noise cancelling in a variety of different environments knowing that if an important sound comes by, they will not miss it. The systems herein may determine that a sound important to the user has been received and active noise cancellation may be temporarily halted or suppressed to allow the user to hear the important sound. Such embodiments may keep the user safe and aware of events occurring in their surroundings, even when the user is wearing an active noise cancelling headset.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

at a sound reproduction system, applying sound cancellation to reduce an amplitude of one or more external sounds;

analyzing the external sounds to determine whether at least one of the external sounds is important enough to be made audible to a user of the sound reproduction system, the analyzing including determining that at least one of the external sounds matches predetermined content that was identified as being sufficiently pertinent to be presented the user;

detecting a direction from which the at least one identified external sound originated; and upon detecting the direction from which the at least one identified external sound originated and upon determining that the external sound is sufficiently pertinent to the user based on the analysis, modifying the sound cancellation such that the at least one identified external sound is presented to the user as coming from the detected direction.

2. The computer-implemented method of claim 1, wherein the at least one identified external sound that is to be made audible to the user comprises a conversation.

3. The computer-implemented method of claim 2, wherein the conversation triggers the sound reproduction system to initialize the sound cancellation.

4. The computer-implemented method of claim 1, wherein the detected direction is implemented as a factor when analyzing the external sounds to identify which of the external sounds are to be made audible to the user.

5. The computer-implemented method of claim 1, further comprising modifying the sound cancellation to present subsequently occurring audio from the detected direction.

6. The computer-implemented method of claim 1, wherein modifying the sound cancellation further comprises increasing audibility of the at least one identified external sound.

7. The computer-implemented method of claim 6, wherein increasing the audibility of the at least one identified external sound comprises compressing a modified sound cancelling signal, such that the modified sound cancelling signal is played back in a shortened timeframe.

8. The computer-implemented method of claim 6, wherein increasing audibility of the at least one identified external sound comprises increasing sound volume along a specified frequency band.

9. The computer-implemented method of claim 1, wherein the at least one external sound that is to be made audible to the user comprises at least one of: an emergency siren, a car horn, a person yelling, or music.

10. The computer-implemented method of claim 1, wherein one or more policies are applied when determining that the at least one identified external sound is to be made audible to the user.

11. The computer-implemented method of claim 1, wherein the at least one identified external sound is assigned a level of severity indicating an associated importance of the at least one identified external sound.

12. The computer-implemented method of claim 11, wherein the sound cancellation is modified upon determining that the at least one identified external sound has a minimum threshold level of severity.

13. A system comprising:

at least one physical processor; and physical memory comprising computer-executable instructions that, when executed by the physical processor, cause the physical processor to:

apply, at a sound reproduction system, sound cancellation to reduce an amplitude of one or more external sounds;

analyze the external sounds to determine whether at least one of the external sounds is important enough to be made audible to a user of the sound reproduction system, the analyzing including determining that at least one of the external sounds matches predetermined content that was identified as being sufficiently pertinent to be presented the user;

detect a direction from which the identified external sound originated; and upon detecting the direction from which the identified external sound originated and upon determining that the external sound is sufficiently pertinent to the user based on the analysis, modify the sound cancellation such that the identified external sound is presented to the user as coming from the detected direction.

14. The system of claim 13, wherein modifying the sound cancellation includes continuing to apply sound cancelling to external sounds received from a plurality of locations, while disabling sound cancelling for external sounds received from a specified location according to the detected direction.

15. The system of claim 13, wherein modifying the sound cancellation includes continuing to apply sound cancelling to external sounds received from a specific person, while disabling sound cancelling for external sounds received from other persons according to the detected direction.

16. The system of claim 13, wherein modifying the sound cancellation includes disabling sound cancelling for specific words detected in the external sounds, while continuing to apply sound cancelling to other words.

17. The system of claim 13, further comprising:

receiving an indication that an event has occurred within a specified distance of the user; and determining that the event is pertinent to the user, wherein the sound cancellation is modified based on the determination that the event is pertinent to the user.

18. The system of claim 17, further comprising directionally orienting one or more microphones configured to listen to the external sounds toward the direction of the event.

19. The system of claim 13, wherein modifying the sound cancellation comprises temporarily pausing sound cancellation and resuming sound cancellation after a specified amount of time.

20. A non-transitory computer-readable medium comprising one or more computer-executable instructions that, when executed by at least one processor of a computing device, cause the computing device to:

at a sound reproduction system, applying sound cancellation to reduce an amplitude of one or more external sounds;

analyzing the external sounds to determine whether at least one of the external sounds is important enough to be made audible to a user of the sound reproduction system, the analyzing including determining that at least one of the external sounds matches predetermined content that was identified as being sufficiently pertinent to be presented the user;

detecting a direction from which the identified external sound originated; and upon detecting the direction from which the identified external sound originated and upon determining that the external sound is sufficiently pertinent to the user based on the analysis, modifying the sound cancellation such that the identified external sound is presented to the user as coming from the detected direction.

* * * * *